(12) United States Patent
Coene et al.

(10) Patent No.: US 7,111,225 B2
(45) Date of Patent: Sep. 19, 2006

(54) VITERBI BIT DETECTION METHOD AND DEVICE

(75) Inventors: Willem Marie Julia Marcel Coene, Eindhoven (NL); Albert Hendrik Jan Immink, Eindhoven (NL); Johannes Wilhelmus Maria Bergmans, Eindhoven (NL)

(73) Assignee: Koninklijke Philips Electronics N. V., Eindhoven, IL (US)

( * ) Notice: Subject to any disclaimer, the term of this patent is extended or adjusted under 35 U.S.C. 154(b) by 0 days.

(21) Appl. No.: 10/528,939

(22) PCT Filed: Aug. 13, 2003

(86) PCT No.: PCT/IB03/03733

§ 371 (c)(1),
(2), (4) Date: Mar. 23, 2005

(87) PCT Pub. No.: WO2004/029956

PCT Pub. Date: Apr. 8, 2004

(65) Prior Publication Data

US 2006/0015798 A1    Jan. 19, 2006

(30) Foreign Application Priority Data

Sep. 26, 2002    (EP)    .................... 02078985

(51) Int. Cl.
*G03M 13/03*    (2006.01)
(52) U.S. Cl. ..................... 714/792; 375/341
(58) Field of Classification Search ................ 370/341; 369/59.24, 275.3, 49
See application file for complete search history.

(56) References Cited

U.S. PATENT DOCUMENTS 5,191,571 A  *  3/1993  Fukumoto et al. ........ 369/44.37

(Continued)

FOREIGN PATENT DOCUMENTS

WO    WO 0018016    3/2000

OTHER PUBLICATIONS

William Weeks et al. The Capacity and Coding Gain of Certain Checkerboard Codes. IEEE Transaction on Information Theory, vol. 44, No. 3, May 1998. pp. 1193-1203.*

(Continued)

*Primary Examiner*—Albert Decady
*Assistant Examiner*—Sam Rizk

(57) ABSTRACT

A Viterbi bit detection method for detecting the bit values of bits of a channel data stream stored on a record carrier along an N-dimensional channel tube, N being at least two, of at least two bit rows one-dimensionally evolving along a first direction and being aligned with each other along at least a second of N−1 other directions, the first direction together with the N−1 other directions constituting an N-dimensional lattice of bit positions, includes application of a row-based one-dimensional Viterbi bit detection method independent for each of the bit rows of said channel tube. To achieve a reliable bit detection, a number of independent one-dimensional row-based Viterbi bit detectors, also known as sequence detectors, is used, one for each bit row in the channel tube: the interference between successive neighboring bit rows is taken into account via the computation of the branch metrics (for the considered bit row), in which local bit decisions on the primary neighboring bits in the neighboring rows are used. As local bit detectors going beyond the performance of a threshold detector, the use of a HD-2 or HD-3-like hard-decision bit detector is proposed.

26 Claims, 10 Drawing Sheets

U.S. PATENT DOCUMENTS

| | | | |
|---|---|---|---|
| 6,253,345 B1* | 6/2001 | Agazzi et al. | 714/752 |
| 6,337,889 B1* | 1/2002 | Mita et al. | 375/341 |
| 6,347,390 B1* | 2/2002 | Ino | 714/792 |
| 6,580,766 B1* | 6/2003 | Coene | 375/341 |
| 2002/0093892 A1* | 7/2002 | Hayashi | 369/44.34 |

OTHER PUBLICATIONS

S. Taira et al; "Study of Recording Methods for Advanced Optical Disks", Technical Report of IEICE, Mar. 2002, pp. 57-64.

T. Kato et al; "Two-Dimensional Partial-Response Equalization and Detection Method with Multi-Track", Technical Report of IEICE, Mar. 2002, 65-70.

* cited by examiner

⊗ = nearest-neighbour bit

⊘ = central-bit or core-bit

------▶ = direction of 1D - PRML

⦀ = TD

⊘ = HD-2, given ⦀ and ⊘

⊘ = bit from branch

------▶ = direction of 1D - PRML

⦀ = TD

⊘ = HD-3, given ⦀ and ⊘

⊘ = bit from branch

HF Reference - Levels
for HD-2 Bit-Unit

| bits HD-2 bit-unit $b_0$ $b_1$ | Reference-Level for bit $b_0$ | Reference-Level for bit $b_1$ |
|---|---|---|
| 0  0 | $R_{\underline{0}0}$ | $R_{0\underline{0}}$ |
| 0  1 | $R_{\underline{0}1}$ | $R_{0\underline{1}}$ |
| 1  0 | $R_{\underline{1}0}$ | $R_{1\underline{0}}$ |
| 1  1 | $R_{\underline{1}1}$ | $R_{1\underline{1}}$ |

FIG.14

VITERBI BIT DETECTION METHOD AND DEVICE

BACKGROUND OF THE INVENTION

1. Field of the Invention

The present invention relates to a row-based Viterbi bit detection method for detecting the bit values of bits of a channel data stream stored on a record carrier. Further, the present invention relates to a corresponding row-based Viterbi bit detector, a method of reproduction of a user data stream, a corresponding reproduction device and a computer program for implementing said methods. In particular, the present invention relates to a row-based Viterbi bit detection method for information written in a two-dimensional way on a record carrier, such as an optical disc or a memory card. The present invention could also be regarded as relating to Partial Response Maximum-Likelihood (PRML) bit detection, i.e., the invention also relates to a PRLM bit detection method and device.

2. Description of the Related Art

European Patent Application No. 01203878.2 discloses a method and system for multi-dimensionally coding and/or decoding an information to/from a lattice structure representing channel bit positions of said coded information in at least two dimensions. Encoding and/or decoding is performed by using a quasi close-packed lattice structure. For the case of three-dimensional encoding and/or decoding, preferably a (quasi) hexagonally close packed (hcp) lattice structure is to be used. Another possibility in three dimensions is the use of a (quasi) face-centered cubic (fcc) lattice structure. For the case of two-dimensional encoding and/or decoding, preferably, a quasi-hexagonal lattice structure is to be used. Another possibility in two dimensions could be the use of a quasi square lattice structure. For the sake of a more simple and clear description of the object of the present invention, special attention is given to the two-dimensional case. The higher-dimensional cases can be derived as more or less straightforward extensions of the two-dimensional case. The special situation of the one-dimensional case which comprises only a single row of bits, boils down to the very classical case of PRML bit detection as is well known in the state of the art for one-dimensional modulation and coding, as, for instance, described in Chapter 7 "Viterbi Detection" by Jan Bergmans, "Digital Baseband Transmission and Recording", Kluwer Academic Publishers, 1996.

In one-dimensional recording on optical discs, the channel bits of the channel data stream are recorded along a spiral track, the spiral being one bit wide. For two-dimensional recording, the channel bits of a channel data stream can also be recorded along a spiral, albeit a broad spiral, that consists of a number of bit rows which are aligned with respect to each other in the radial direction, that is, in the direction orthogonal to the spiral direction. The additional alignment of bit rows can also be obtained in another direction not strictly orthogonal to the spiral direction, but in a direction making a certain non-zero angle with the spiral direction.

A PRML bit detection apparatus for deriving a bit sequence from an input information signal is disclosed in WO 00/18016, corresponding to U.S. Pat. No. 6,580,766. The apparatus comprises input means for receiving the input information signal, sampling means for sampling the input information signal at sampling instants so as to obtain samples of the input information signal at said sampling instants, conversion means for converting an array of said samples into an array of bits of a first or a second binary value, detection means for repeatedly detecting a state for subsequent sequences of n subsequent bits of said array of bits, said subsequent sequences being obtained by shifting a time window of n subsequent bits each time over one bit in time, means for establishing the best path through the states, and deriving means for deriving a sequence of bits in accordance with the best path through said states. In that apparatus, n is larger than 3, and sequences of n subsequent bits having n−1 directly successive bits of the same binary value are allocated to the same state. In a specific embodiment, n is an odd number larger than 4. In that specific embodiment, sequences of n subsequent bits having n−2 directly successive bits of the same binary value as the central n−2 bits in such n-bit sequence, are allocated to the same state. This results in a PRML detection apparatus with reduced complexity.

A full-fledged PRML bit detector for 2D bit-arrays would require a trellis which is designed for the complete width of the broad spiral, with the drawback of an enormous state-complexity that leads to a completely impractical algorithm, since it cannot by far be implemented even in the fastest hardware of the coming decennia.

A 2D PRML bit detector is disclosed in "Study of Recording Methods for Advanced Optical Disks", S. Taira, T. Hoshizawa, T. Kato, Y. Katayama, T. Nishiya, T. Maeda, Technical Report of IEICE, 2002–03, pp. 57–64. Therein, an optical storage system with 2D modulation on a square lattice, with d=1 RLL constraints both in horizontal and vertical directions is described. For this system, a receiver, consisting of a 2D-equalizer and a 2D-Viterbi detector or a 2D-PRML detector, is disclosed in "Two-Dimensional Partial-Response Equalization and Detection Method with Multi-Track", T. Kato, S. Taira, Y. Katayama, T. Nishiya, T. Maeda, Technical Report of IEICE, 2002–03, pp. 65–70. The 2D PRML detector is based on three successive bit rows, but the typical add-compare-select operation (ACS) of the Viterbi-algorithm uses the HF-samples of the central bit row only; the other two bit rows are used in order to determine, in a joint way, the reference level from which the received HF-signal should be subtracted in order to derive the branch metrics for the branches (or transitions) in the trellis diagram of the Viterbi detector. In this way, at its output, the Viterbi-detector yields bit-decisions for the central bit row only. In this sense, for successive rows, the PRML detectors operate already independently, and the state-complexity for the complete set of bit rows has been reduced down to the complexity that is to be associated with 3 rows only. Within a strip of 3 rows, the known bit detector performs a kind of 2D-PRML, but with a 1D-output (for the single row being the mid-row of the 3-row strip). It should be noted that the channel strips are processed independently, but that the state-complexity of the Viterbi-detector is still quite high.

Assuming the practical case of a 3-taps response in the tangential direction, as disclosed in the above mentioned documents. For the square lattice, but also when applying this algorithm for a hexagonal lattice, assuming no modulation coding for both lattices, states characterized by 6 bits each would be obtained, yielding a number of $2^6$=64 states; each state would then have $2^3$=8 possible predecessors. On the square lattice, assuming the runlength modulation coding of the above references with 2D d=1 constraint, the number of states is only a bit smaller than 64, since some of the states are forbidden just because of the use of the runlength constraints along vertical and horizontal directions.

SUMMARY OF THE INVENTION

It is an object of the present invention to provide a Viterbi bit detection method that provides a high recording density, in particular, such that the traditional "eye" of the eye pattern may even be closed. The "eye height" in the traditional eye-pattern corresponds with the systematic minimum difference in signal levels for the case that a bit has a value "0" and the case that a bit has a value "1". An "open eye" means that (on average, or without any noise) the signal levels for bit "0" and bit "1" can be clearly discriminated: in such case, a threshold detection procedure with an appropriately set slicer level could be used. The case of a "closed eye" corresponds to the situation where some of the signal levels cannot unambiguously be allocated to bit "0" or bit "1", even in the absence of noise. There is, in the latter case, a range of signal levels, called the erasure zone, where the signal levels for bit "0" and bit "1" overlap.

It is a further object of the present invention to achieve a low bit error rate, which is particularly less than $10^{-2}$ to $10^{-1}$ as would be achieved for the case of a "closed eye" by application of a straightforward threshold detection prior to ECC decoding. Preferably, the symbol or byte error rate (BER) for "random" errors (as opposite to so-called "burst errors") in the case of a byte-oriented ECC, like the picket-ECC as used in BD (formerly known as DVR), shall not be larger than $2 \times 10^{-3}$; for an uncoded channel bit stream this corresponds to an upper bound on the allowable channel-bit error rate (bER) of $2.5 \times 10^{-4}$.

Still further, a further reduction of the state-complexity of the independent Viterbi-detectors shall be achieved.

These objects are achieved according to the present invention by a Viterbi bit detection method, according to which the channel data stream is stored on a record carrier along an N-dimensional channel tube, N being at least two, of at least two bit rows one-dimensionally evolving along a first direction and being aligned with each other along at least a second of N−1 other directions, said first direction together with said N−1 other directions constituting an N-dimensional lattice of bit positions, comprising application of a row-based one-dimensional Viterbi bit detection method independent for each of the bit rows of said channel tube, wherein:

calculation of the branch metrics for all possible state transitions in a Viterbi trellis of a one-dimensional row-based Viterbi detector, said transitions representing a number of subsequent bits in said bit row, said bits being the central-row bits of a cluster of the N-dimensional lattice of bits, is based on the difference of the received HF signal value with respect to a reference level, wherein said reference level depends on all bits of said cluster, said cluster comprising in addition to the central-row bits a number of primary neighboring bits in each of a number of neighboring bit rows on each side along said N−1 other directions of said central bit row along which the one-dimensional Viterbi bit detection method is applied, and wherein preliminary bit decisions for the primary neighboring bits in the neighboring bit rows are used for determining the reference level to be used for calculating said branch metrics, and selection of the bit value for the central bit of said cluster of the N-dimensional lattice of bits, corresponding with said received HF signal value, is based on the calculated branch metrics.

These objects are further achieved by a row-based Viterbi bit detector comprising Viterbi bit detection units including means for calculation of the branch metrics and means for selection of a bit value. The invention relates further to a method of reproduction of a user data stream, which is error correction code encoded and modulation code encoded into a channel data stream and stored on a record carrier, comprising a Viterbi bit detection method as described above for detecting the bit values of bits of the channel data stream and a modulation code decoding method and an error correction code decoding method. Still further, the present invention relates to a reproduction device and a computer program.

The present invention is based on the idea to achieve reliable bit detection by using a number of independent 1D Viterbi sequence-detectors, one for each bit row in the channel tube: the interference between successive neighboring bit rows is taken into account via the computation of the branch metrics for the considered bit row, in which preliminary bit decisions on the primary neighboring bits are used that may require local bit decisions on the secondary neighboring bits in the neighboring bit rows, said secondary neighboring bits being the neighboring bits of said primary neighboring bits not being part of the central bit row being considered for the 1D Viterbi detection.

Regarding the general layout and function of a PRML bit detection apparatus, reference is made to the above-mentioned WO 00/18016 where also several terms are explained. This description and explanation is herein incorporated by reference.

In preferred embodiments for determining the preliminary bit decisions on the primary neighboring bits, a slicer level can be used in a threshold detection. Further, specific bit values of the bits in the central row can be used in accordance with each of the specific branches to be considered in the Viterbi trellis. Said threshold detection is based on the detected HF signal value for a particular bit without consideration of the HF-signal samples at the neighboring bit-locations.

According to a preferred embodiment, a predetermined criterion is evaluated for determining the preliminary bit decisions, this criterion being determined by the sum over all the primary neighboring bits, said sum comprising terms related to a subcriterion that is based on the differences of the HF signal value and a reference HF signal value corresponding to the bit cluster of each single primary neighboring bit, the evaluation being done for all possible bit units obtained for all possible values of said primary neighboring bits, and wherein the bit unit with the lowest value of said predetermined evaluation criterion is selected. Preferred subcriteria relate to the squared value or the absolute value of the difference of the HF signal value and a reference HF signal value corresponding to the bit cluster of each single primary neighboring bit.

In addition to the primary neighboring bits, preliminary bit decisions on secondary neighboring bits can be used for determining the preliminary bit decisions on the primary neighboring bits. Those preliminary bit decisions on said secondary neighboring bits can be obtained, for instance, by threshold detection.

There are different ways to calculate the branch metrics. The Viterbi algorithm in a PRML bit detector searches for the "best" path, that is, the path with the minimum path cost. The path cost is sometimes called "path metric". A path can be seen as a succession of transitions. A transition from one state to another state is called a branch. Each transition (or branch) has associated with it a certain branch metric (or branch cost). The path metric for a given path is the sum of the costs of the individual branches of the path, that is, the path metric is a sum of a selection of branch metrics.

Generally, the present invention is applicable to a multi-dimensional code, where the channel words of the channel data stream may evolve in more than one direction as is the case for a card-based system, i.e., where the channel data stream is stored on a record carrier along a multi-dimensional channel tube with dimension at least two. Therein, the first direction along which the bit rows evolve is preferably common to all bit rows of the channel tube. The first direction constitutes, together with the N−1 other directions, along which the bit rows are aligned with each other, an N-dimensional space and an N-dimensional lattice of bit positions. The channel tube comprises at least two bit rows of channel bits evolving along said first direction, and the collection of all said channel tubes fill the whole N-dimensional space.

However, it is preferred to apply the invention to a channel data stream which comprises a one-dimensionally evolving bit sequence, or which comprises a channel strip of at least two bit rows one-dimensionally evolving along a first direction and aligned with each other along a second direction, preferably oblique or even orthogonal to said first direction, said two directions constituting a two-dimensional lattice of bit positions. Preferred embodiments of such a lattice are a 2D lattice of a square or a hexagonal type.

In a hexagonal lattice, hexagonal clusters may be formed of a set of 7 bits in total, comprising three bits in a central bit row and two primary neighboring bits in each of the two neighboring bit rows. Further secondary neighboring bits can be located in the neighboring bit rows of the central bit row considered. Preferred embodiments of the invention use hexagonal clusters.

An advantageous embodiment for calculation of the branch metrics uses an expectation value. The method can also be applied in the three-dimensional case where the bits are location on bit positions of a three-dimensional lattice.

The bit detection method according to the invention can also include an iterative use of the row-based one-dimensional Viterbi bit detection method: the output of the 1D-Viterbi detectors for a given 1D part of the set of bit rows can be used for the required primary bit decisions in the neighboring rows during a second run of the method for the same 1D part (same bits along the 1D row) of the set of rows. The purpose is to use the output of the first set of 1D-Viterbi detectors for all bit rows as a better bit decision for the primary bit decisions required in a possible second set of Viterbi detectors for all bit rows.

BRIEF DESCRIPTION OF THE DRAWINGS

The invention shall now be explained with reference to the drawings, in which:

FIG. 14 shows the HF reference signal levels used in the bit detector shown in FIG. 13;

DESCRIPTION OF THE PREFERRED EMBODIMENTS

Figure 1:
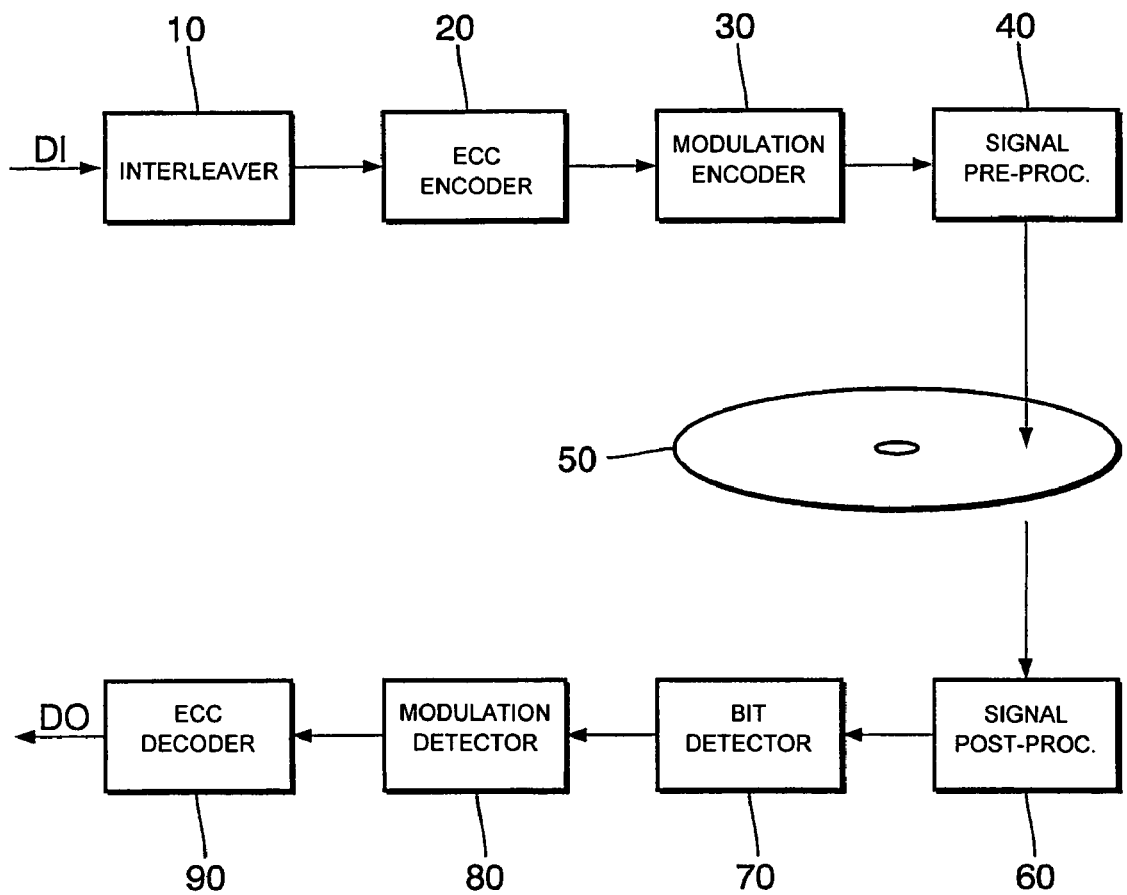
FIG. 1 shows a block diagram of a general layout of a coding system.

FIG. 1 shows typical coding and signal processing elements of a data storage system. The cycle of user data from input DI to output DO can include interleaving 10, error-correction-code (ECC) and modulation encoding 20, 30, signal preprocessing 40, data storage on the recording medium 50, signal post-processing 60, binary detection 70, and decoding 80, 90 of the modulation code, and of the interleaved ECC. The ECC encoder 20 adds redundancy to the data in order to provide protection against errors from various noise sources. The ECC-encoded data are then passed on to a modulation encoder 30 which adapts the data to the channel, i.e., it manipulates the data into a form less likely to be corrupted by channel errors and more easily detected at the channel output. The modulated data are then input to a recording device, e.g., a spatial light modulator or the like, and stored in the recording medium 50. On the retrieving side, the reading device (e.g., photo-detector device or charge-coupled device (CCD)) returns pseudo-analog data values which must be transformed back into digital data (one bit per pixel for binary modulation schemes). The first step in this process is a post-processing step 60, called equalization, which attempts to undo distortions created in the recording process, still in the pseudo-analog domain. Then, the array of pseudo-analog values is converted to an array of binary digital data via a bit detector 70. The array of digital data is then passed first to the modulation decoder 80, which performs the inverse operation to modulation encoding, and then to an ECC decoder 90.

In the above-mentioned European Patent Application No. EP 01203878.2, the 2D constrained coding on hexagonal lattices in terms of nearest-neighbor clusters of channel bits is described. Therein, it has been focused mainly on the constraints with their advantages in terms of more robust transmission over the channel, but not on the actual construction of such 2D codes. The latter topic is addressed in European Patent Application No. 02076665.5 (PHNL 020368), i.e., the implementation and construction of such a 2D code is described therein. By way of example, a certain 2D hexagonal code shall be illustrated in the following. However, it should be noted that the general idea of the invention and all measures can be applied generally to any 2D code, in particular, any 2D hexagonal or square lattice code. Finally, the general idea can also be applied to multi-dimensional codes, possibly with isotropic constraints, characterized by a one-dimensional evolution of the code.

Figure 2:
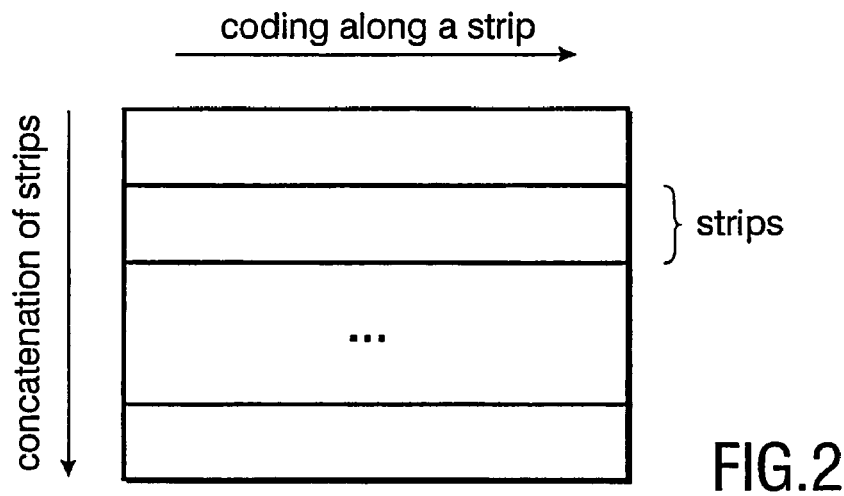
FIG. 2 shows a schematic diagram indicating a strip-based two-dimensional coding scheme.

As mentioned, in the following, a 2D hexagonal code shall be considered. The bits on the 2D hexagonal lattice can be identified in terms of bit clusters. A hexagonal cluster consists of a bit at a central lattice site, surrounded by six nearest neighbors at the neighboring lattice sites. The code evolves along a one-dimensional direction. A 2D strip consists of a number of 1D rows, stacked upon each other in a second direction orthogonal to the first direction. The principle of strip-based 2D coding is shown in FIG. 2. Between the strips or between groups of successive strips, a guard band of, for instance, one row may be located.

Figure 3:
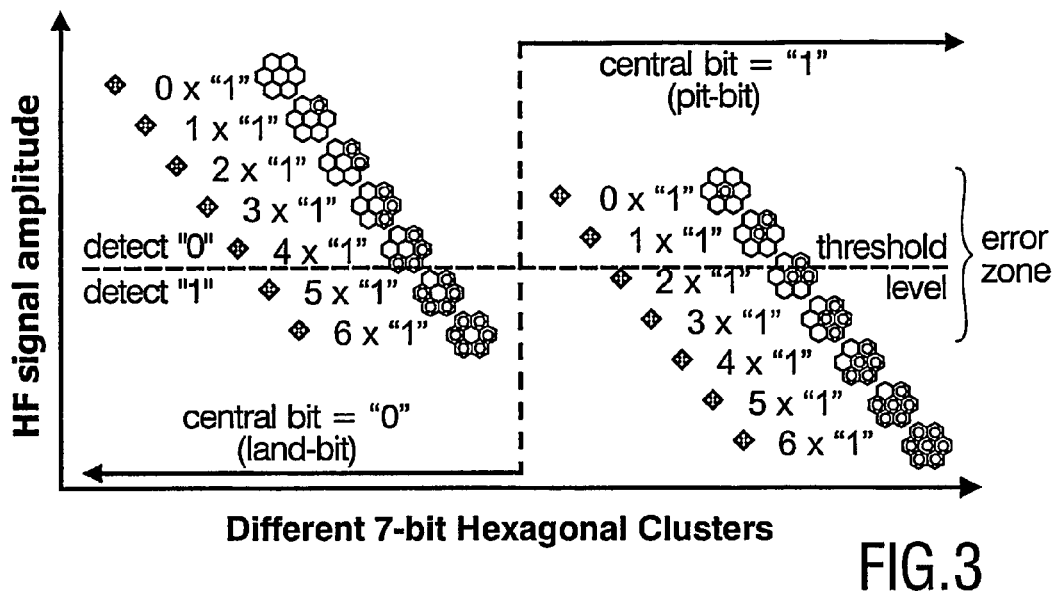
FIG. 3 shows a schematic signal-pattern for a two-dimensional code on hexagonal lattices.

The signal-levels for 2D recording on hexagonal lattices are identified by a plot of amplitude values for the complete set of all hexagonal clusters possible. Use is further made of the isotropic assumption, that is, the channel impulse response is assumed to be circularly symmetric. This implies that, in order to characterize a 7-bit cluster, it only matters to identify the central bit, and the number of "1"-bits (or "0"-bits) among the nearest-neighbor bits (0, 1, ..., 6 out of the 6 neighbors can be a "1"-bit). A "0"-bit is a land-bit in our notation. A typical "Signal-Pattern" is shown in FIG. 3. Assuming a broad-spiral consisting of 11 parallel bit rows, with a guard band of 1 (empty) bit row between successive broad spirals, the situation of FIG. 3 corresponds to a density increase with a factor of 1.7 compared to traditional 1D optical recording (as used in e.g., in the Blu-ray Disc (BD) format (using a blue laser diode)).

Figure 4:
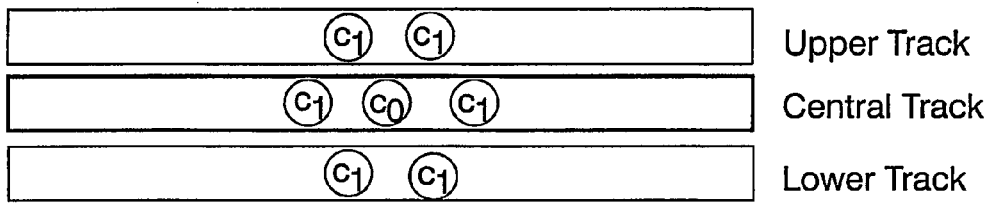
FIG. 4 shows a row-based partitioning of the 2D target response on the hexagonal bit cluster.
Figure 5:
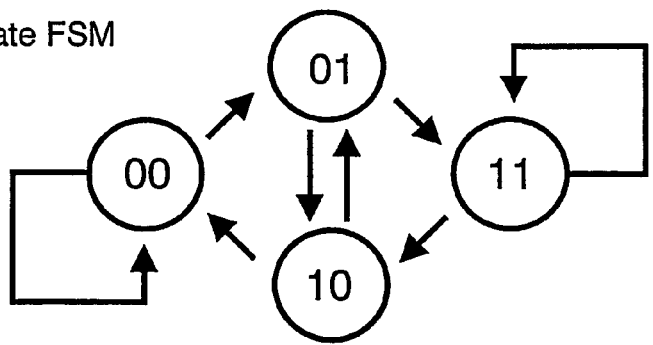
FIG. 5 shows a Finite-State-Machine for an 1D-PRML with 3-tap PRML target.

According to the present invention, the broad spiral (or meta-spiral) consists of a number of bit rows. It is proposed to apply a row-based 1D-PRML, in which the Viterbi-trellis relates only to the bits in the individual bit row itself. For a 3-tap target response in the direction along the bit row, states are obtained that are each defined by two bits. FIG. 4 shows the 2D target response on the cluster of bits of the hexagonal lattice. The corresponding Finite-State Machine (FSM) is shown in FIG. 5. The FSM reveals the syntax when going from one state "i" (with bits $(b_0^i\ b_1^i)$) towards another state "j" (with bits $(b_0^j\ b_1^j)$). Such a transition between states "i" and "j" is only allowed on the condition that $b_1^i = b_0^j$, i.e., the second bit of the first state and the first bit of the second state must be identical. It should be noted that a transition from one state "i" to another state "j" completely characterizes the three bits of the 7-bits cluster at the central bit row by $(b_0^i\ b_1^i\ b_1^j)$. No further restrictions are present on the possible transitions, because in the practical description made here, there is no 1D RLL constraint assumed for the case of our 2D hexagonal-lattice modulation.

Figure 6:
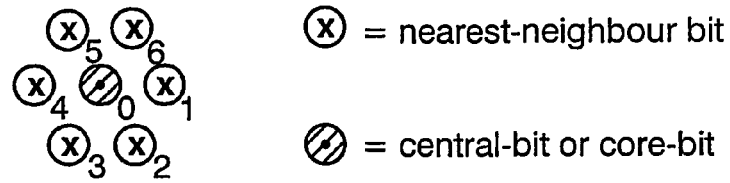
FIG. 6 shows a hexagonal bit-cluster with enumeration convention used in this application.

Next, the computation of branch metrics shall be explained. FIG. 6 shows the enumeration of the 7 bits of an hexagonal cluster: $x_0$, $x_1$, $x_2$, $x_3$, $x_4$, $x_5$, and $x_6$. The branch metric for the transition from state "i" to state "j" is denoted by $\beta_{ij}$. It is preferably given by:

$$\beta_{ij} = (HF_0 - R.L.[x_0 = b_1^i; x_1 = b_1^j; x_2; x_3; x_4 = b_0^i; x_5; x_6])^2$$

where $HF_0$ denotes the sample value of the (possibly equalized) received signal at the (central) bit $x_0$. R.L. denotes the reference amplitude level, which depends on all the bit-values of the 7-bit cluster. For a given transition ("i" to "j"), the values of the bits $x_0$, $x_1$ and $x_4$ in the central bit row are already fixed. The other bits that still need to be determined, occur in two pairs of bits, denoted by $x_2$, $X_3$ and $x_5$, $x_6$.

These pairs correspond with nearest neighbor bits of the central bit x0, where each of these pairs is located either in the upper neighboring bit row, or in the lower nieghboring bit row. The bit values in these two bit-pairs are required in order to be able to uniquely identify the reference level R.L. to be used in the branch metric for the transitions in the 1D-PRML detector for the considered bit row. These bits will be further referred to as the primary neighboring bits. Therefore, these bit decisions on the primary neighboring bits can be seen as preliminary bit decisions, needed to assist the evaluation of the branch metrics required for the bit decisions of the bit in the considered (central) bit row. One aspect of the present invention relates to the decisions that are to be made on those two bit-pairs of primary neighboring bits. The quality of these (temporarily needed) preliminary bit decisions that are (only) required for the computation of branch metrics, have an impact on the quality of the ultimate bit decisions of the bits in the central row on which the 1D-PRML is applied. The preliminary bit decisions on the primary neighboring bits are thus never used as real output bits for the neighboring bit rows.

A rather straightforward approach is to use threshold detection for the primary neighboring bits denoted by $x_2$ and $x_3$ and $x_5$ and $x_6$. However, threshold detection is highly unreliable due to the large overlap in signal levels in the signal pattern shown in FIG. 3. In the performance analysis, it turns out that not much performance gain is obtained from the use of 1D-PRML with threshold detection for the primary neighboring bits compared to threshold detection applied as the bit detector on the whole meta-spiral. The quality of the primary neighboring bit decisions is obviously not good enough.

More reliable bit decisions at the primary neighboring bits can be obtained through the use of the hard-decision bit detectors on nearest-neighbor bits in neighboring bit rows.

Figure 7:
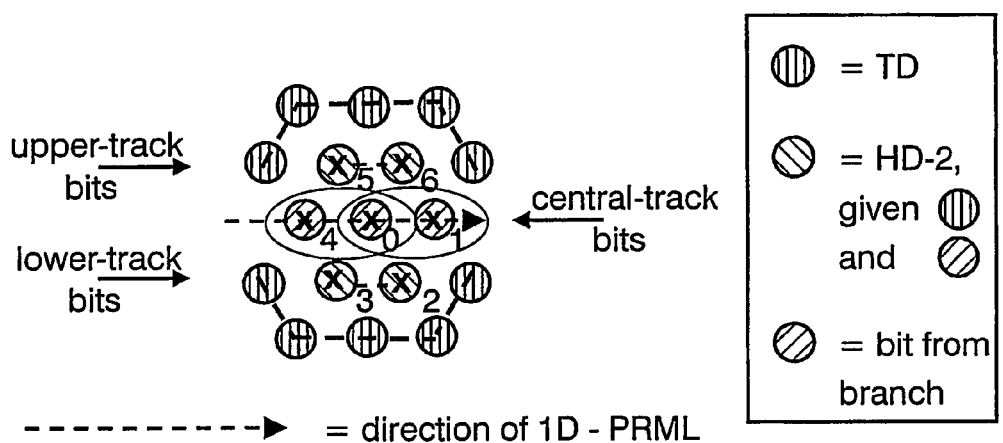
FIG. 7 illustrates the invention in case two primary neighboring bits are used.

FIG. 7 illustrates the use of a HD-2 (HD=hard-decision) bit detector which uses preliminary bit decisions on a doublet of two primary neighboring bits in each of the upper and lower neighboring bit row of the central bit row. As explained above, the bit values of the bits in the central bit row are fixed for a given branch in the trellis. The bit-values of the primary neighboring bits in the neighboring bit rows are determined as follows, wherein the bit-pairs (also referred to as bit units) denoted by $x_2$ and $x_3$, and $x_5$ and $x_6$ are treated independent of each other: a criterion, preferably the sum of two terms, each term being a square of a difference of the actual received HF sample at one bit of the bit pair with the corresponding reference level for that primary neighboring bit in the bit pair, is evaluated for all possible two-bit combinations of the bits in the bit pair. The bit-pair which has the lowest value for the criterion is selected. This yields the preliminary bit values to be used in the reference level for the branch metric at the bit $x_0$ in the central row. But also for the primary neighboring bit values, reference levels need to be specified for the criterion of the HD-2 detector. Therefore, the bit values of all nearest-neighbor bits for each bit of the two bit pairs of primary neighboring bits are needed as well. Some of these neighbors are fixed by the branch considered, others are part of the HD-2 selection procedure; all other remaining nearest-neighbor bits for each primary neighboring bit of the two bit-pairs are referred to as secondary neighboring bits, which may preferably be obtained by threshold detection (TD).

Figure 8:
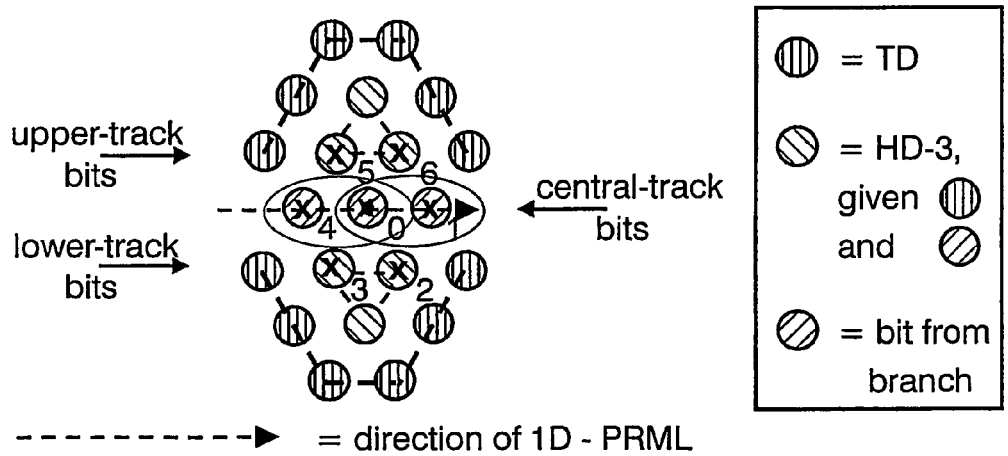
FIG. 8 illustrates the invention in case three primary neighboring bits are used.

FIG. 8 illustrates the use of a HD-3 bit detector which uses preliminary bit decisions on triplets of three primary neighboring bits in the two upper and the two lower neighboring bit rows of the central bit row. The procedure is quite similar to the one explained above for the HD-2 bit detector. Preliminary bit decisions are required at the primary neighboring bits of the two bit pairs denoted by $x_2$ and $x_3$, and $x_5$ and $x_6$. Each bit pair is again processed independently. To each bit pair is added a third bit in the second neighboring bit row of the central bit row so that a bit-triplet (also referred to as bit unit) is formed. There are 8 possible bit-triplets. As above, a criterion is evaluated for each of these 8 possibilities, and the one with the lowest value is selected. The criterion used for the HD-3 bit detector is a sum of three terms, one for each bit in the triplet. Each term corresponds to one bit in the triplet, and preferably is the squared value of the difference between the measured HF signal at that bit and the corresponding reference level. The latter is determined by using bit values of the nearest-neighbor bits of the bits in the triplets; some of these nearest neighbor bits are fixed by the branch considered, others are part of the HD-3 selection procedure, and yet other bits, i.e., the 6 bits surrounding the bit-triplet in the neighboring bit rows of the central bit row, which bits are further referred to as secondary neighboring bits, may preferably be determined by threshold detection (TD). From the chosen bit-triplet, only the bits of the bit pairs $x_2$ and $x_3$ for the bottom bit-triplet, and $x_5$ and $x_6$ for the top bit-triplet are needed in order to choose the reference level that has to be used in the computation of the branch metric for the 1D-PRML at the bit x0 in the considered bit row (assuming that the intersymbol-interference of which the bit detector can take care of resides within a hexagonal cluster comprising not more than 7 bits). However, inclusion of the extra third bit in each of both 3-bit bit units may largely improve the quality of the preliminary bit decisions on the primary neighboring bit pairs $x_2$ and $x_3$ for the bottom bit-triplet, and $X_5$ and $x_6$ for the top bit-triplet.

Figure 9:
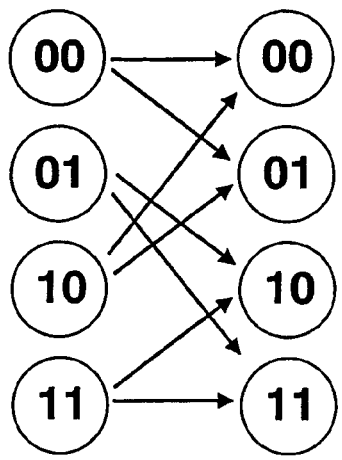
FIG. 9 shows a trellis for 1D-PRML bit detection.

The trellis for 1D-PRML bit detection with 3-taps impulse-response in the tangential direction is illustrated in FIG. 9. As can be seen, each state has exactly two predecessor states.

These two predecessor states are the states that have, as a last bit, the first bit of the current (considered) state. For instance, transitions from state "01" are only allowed for the states "10" and "11" as next state. These transitions yield the 3-bit sequences "010" and "011", respectively.

Figure 10:
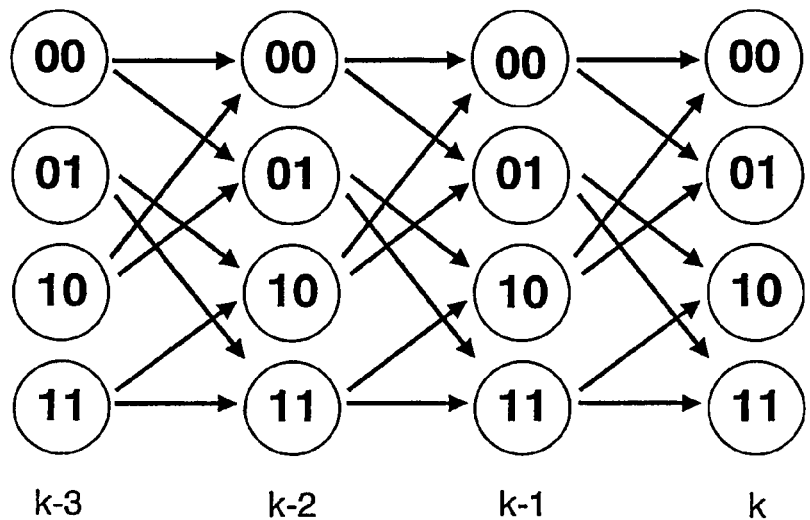
FIG. 10 shows a repeated trellis for 1D-PRML bit detection.

FIG. 10 shows the repeated trellis for 1D-PRML bit detection with 3-taps impulse-response in the tangential direction.

All paths through the trellis realize all possible bit sequences. The Viterbi algorithm (for maximum-likelihood sequence detection) searches for the "best" path, that is, the path with the minimum path cost. The path cost is sometimes called "path metric". A path can be seen as a succession of transitions. A transition from one state to another state (from moment k towards moment k+1) is also called a branch. Each transition (or branch) has associated with it a certain branch metric (or branch cost). The path metric for a given path is the sum of the costs of the individual branches of the path, that is, the path metric is a sum of branch metrics.

For the above case (with 2-bits states "00", "01", "10" and "11"), a branch metric for a transition between states s0 and s1, from moment (or time) k−1 to moment k, is the squared value for the L2-norm (or absolute value for the L1-norm) of the difference between the measured HF-sample at time k (denoted by HFk) and the reference level R.L. that is associated with the transition from state s0 to state s1. The reference level is a kind of ideal (noise-free) signal level for the transition that is considered.

The reference level here also depends on the bit values of the neighboring bit rows, because of the strong 2D inter-symbol-interference (ISI). In standard 1D-storage, the neighboring bit rows are always far away so that this problem is not present there.

Figure 11:
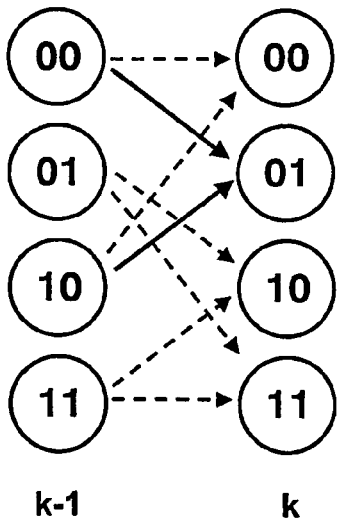
FIG. 11 illustrates a particular example using the trellis shown in FIG. 9.

The applied Viterbi algorithm shall now be explained with reference to FIG. 11. Finding the best path via a brute force (exhaustive) search is not favorable because of the computational burden. Viterbi has introduced the procedure of "dynamic programming" with a complexity that is linearly growing with the length of the bit-sequence to be determined. In the following, it shall be assumed that the best path at time k that arrives in state "01" shall be found. It is further assumed that the following two aspects for each of the states have previously been evaluated at time k−1:

(a) for each state, the path metric for the best path, i.e., the path with minimum cost, that arrives in that state, is known;

(b) for each state, the predecessor state at the previous time is known: the predecessor state is the state that lies on the best path at the previous time moment.

Then, the best path at moment k that arrives in "01" can be found by looking at the two possible predecessor states of state "01": one path starts in state "00" with a path metric $p_{00,k-1}$ and needs a branch "00"->"01" to arrive in state "01", with a branch metric given by $b_{00->01,k}$. The second path starts in state "10" with a path metric $p_{10,k-1}$ and needs a branch "10"->"01" to arrive in state "01", with a branch metric given by $b_{10->01,k}$. The best path is the path that realizes the minimum cost:

$$\text{minimum of } p_{00,k-1}+b_{00->01,k} \text{ and } p_{10,k-1}+b_{10->01,k}.$$

If the latter is the best path, then the predecessor state of state "01" is "10", in the other case, the predecessor state of state "01" is "00". This procedure is known as Add-Compare-Select (ACS): the branch metric is added to the previous path metric to obtain a candidate for the current path metric; the two candidate path metrics are compared, and the path with the lowest metric is selected.

This procedure is repeated for all states (at each time moment). As a result, a collection of path metric and predecessor state for each state and each time moment is obtained. The actual bit detection is then performed by a so-called back-tracking operation: one starts from a best state at moment k, and goes back to its predecessor state at time k−1, and to the predecessor state of that state at moment k−2, and so on. The back-tracking is done for a certain depth K (known as back-tracking depth); the bit value at moment k−K is (for instance) the bit-value of the first bit in the resulting state obtained at the end of the back-tracking operation. States "00" and "01" lead to bit "0"; states "10" and "11" lead to bit "1".

Figure 12:
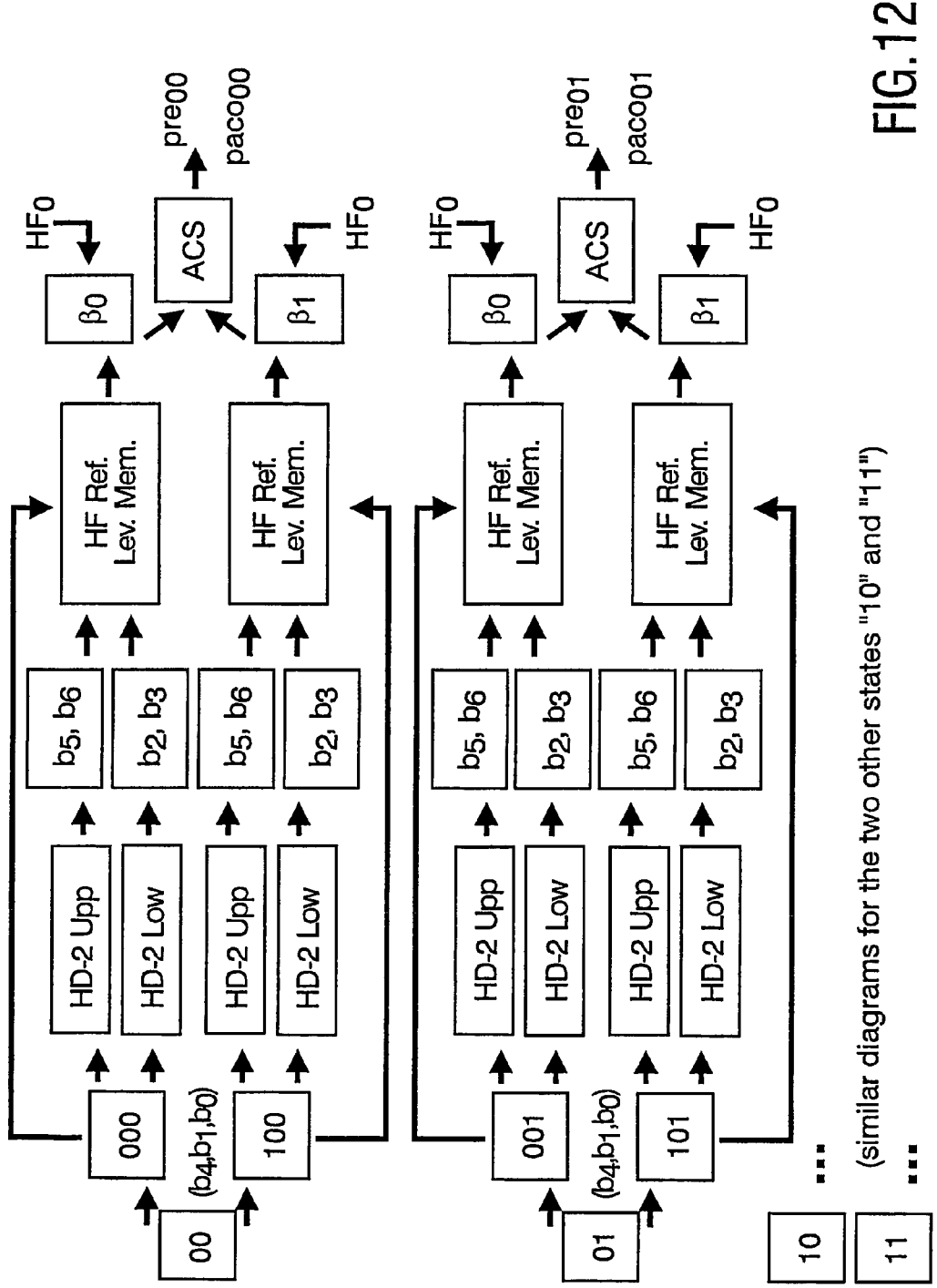
FIG. 12 illustrates the determination of the path cost according to the present invention.

There are four states, denoted by "00", "01", "10" and "11". For each of these states, the best predecessor of that state and the path costs up to the given state for the path with the lowest cost going to that state are evaluated, as illustrated in FIG. 12. For state "00", for instance, possible predecessor states are the states "00" and "10", leading to the bits "000" (from state "00" towards state "00") and "100" (from state "10" towards state "00") for the triplet of bits denoted by ($b_4$, $b_0$, $b_1$), as denoted by the upper and lower line related to state "00". These separate transitions towards state "00" are called branches of the trellis. The bit $b_0$ is the central bit of the triplet. For a given state, thus two possible branches are there. For each of the branches, the most likely candidates for the bits $b_2$ and $b_3$ in the lower row relative to the considered row, and for the bits $b_5$ and $b_6$ in the upper row relative to the considered row are determined.

According to the embodiment shown in FIG. 12, this is done by using an HD-2 detector for each of the two bit-pairs ($b_2$ and $b_3$) and ($b_5$ and $b_6$): the respective HD-2 detectors are denoted by "HD-2 Upp" and "HD-2 Low" in FIG. 12. The resulting four bits ($b_2$ and $b_3$, $b_5$ and $b_6$) together with the bits of the bit-triplet ($b_4$, $b_0$, $b_1$) define the 7 bits of the hexagonal cluster: these 7 bits uniquely define an index for the specific reference level in the memory of Reference Levels, the latter being denoted by HF Ref.Lev.Mem. The reference levels for each of the two branches (for each of the four states) is compared with the actually measured HF signal for bit $b_0$, denoted by HF. Such comparison can be done by a squared value in case of the L2-norm (or absolute value in case of the L1-norm) of the difference of the received signal and the reference level: such difference value yields the actual branch metric for each of the two transitions in the trellis. A standard Add-Compare-Select (ACS) unit that uses the current branch metrics and the path metrics up to the two possible preceding states, i.e., "00" and "10" in the case of state "00", further determines the best predecessor of the current state, denoted as pre$_{00}$, and the path cost for the cheapest path up to the currently considered state "00", denoted by paco$_{00}$. This procedure is done for each of the four possible states separately and independently, since no information exchange is needed between the distinct procedures for each of the four states.

Figure 13:
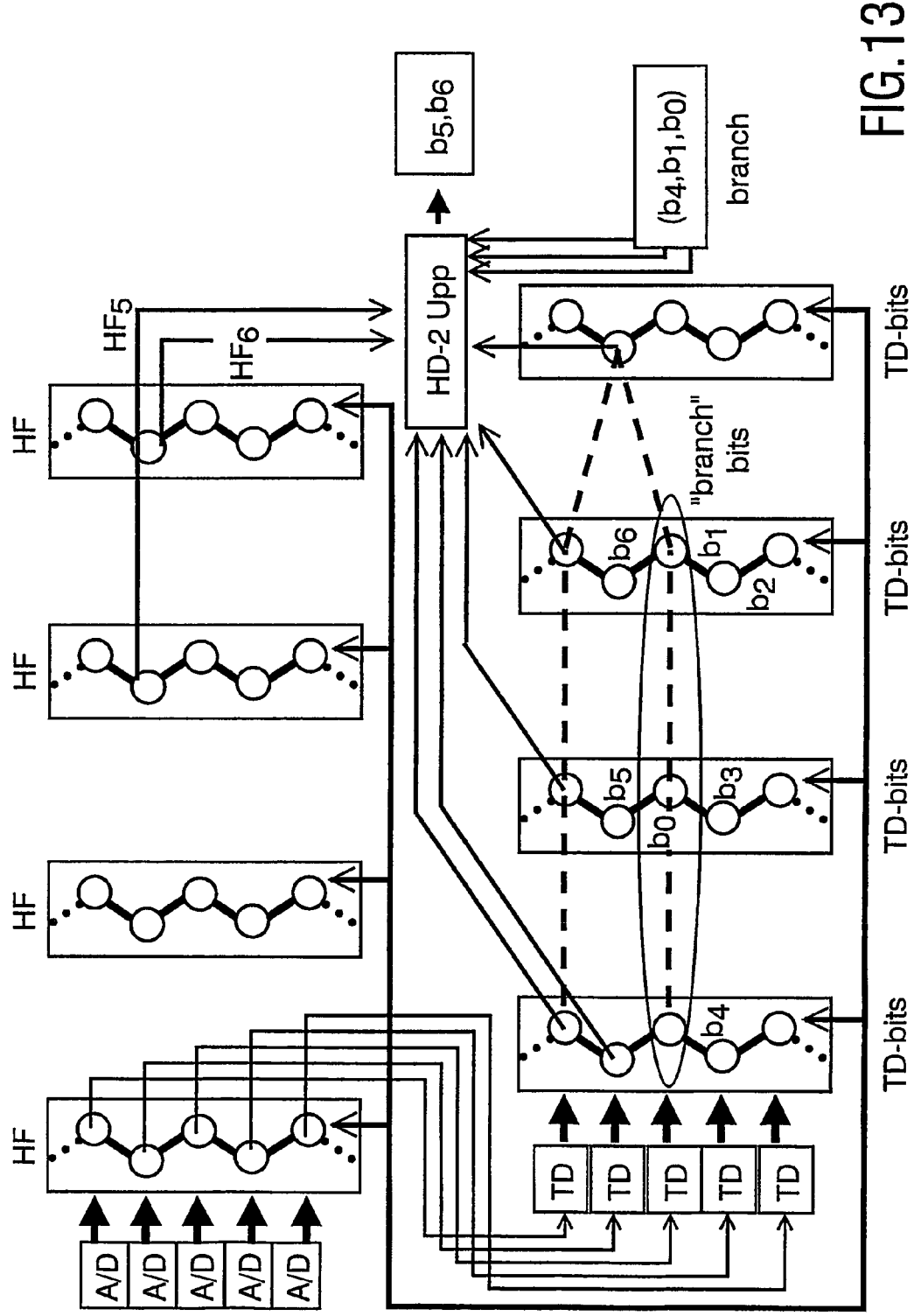
FIG. 13 shows a block diagram of a bit detector in case two primary neighboring bits are used in each primary neighboring bit row.

FIG. 13 shows the HD-2 bit detector HD-2 Upp for the determination of the upper-row bits ($b_5$ and $b_6$). The HD-2 Upp block has as input 8 bit values of the neighboring bits, three of which are set by the considered branch in the trellis for the central row, which is the row under consideration; the other 5 bits are referred to as secondary neighboring bits, and are obtained as simply threshold-detected bits derived from the HF-samples at the corresponding bit-positions. The HD-2 Upp block also has two HF-samples as input for the bit-locations of bits $b_5$ and $b_6$.

The so-called "branch-bits" apply for the three bits of a given transition in the trellis for the bit row under consideration.

A similar diagram (not shown) applies for the block HD-2 Low, yielding bit decisions in the lower row for the bits denoted by $b_2$ and $b_3$. The bits determined by the HD-2 Upp block are further used, together with the similarly derived— by means of block HD-2 Low—lower bits $b_2$ and $b_3$ to derive reference levels from a reference level memory as shown in FIG. 12.

Reference levels to be used in the core of HD-2 bit detector are shown in FIG. 14. The bit-numbering applied in FIGS. 14 and 15 should be noted which refers to the order of the bits in the bit pair. For the first bit in the bit pair, bit $b_0$, the reference levels are denoted with the first sub-script underlined; for the second bit in the bit pair, bit $b_1$, the reference levels are denoted with the second sub-script underlined.

Figure 15:
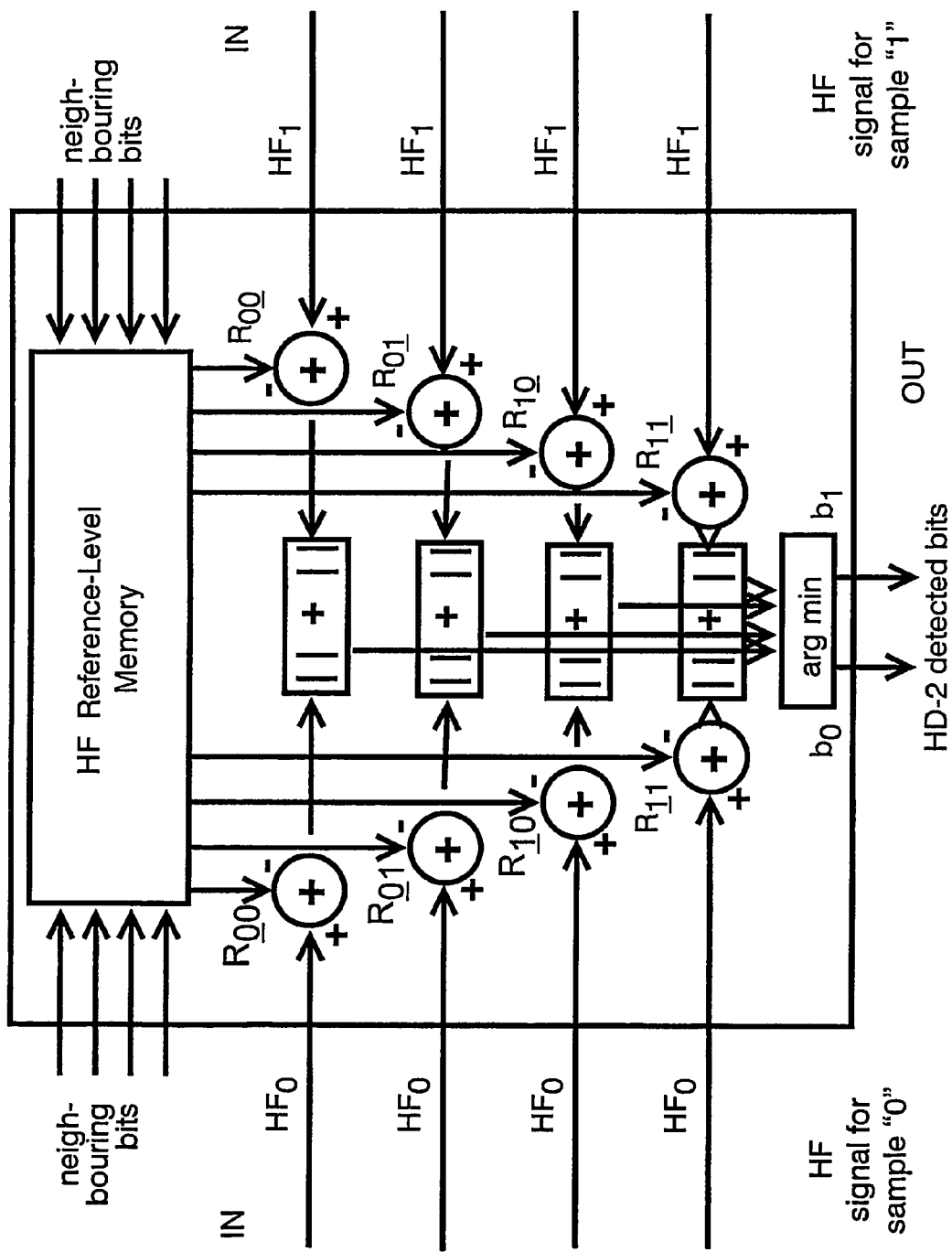
FIG. 15 shows a single bit detection unit of a bit detector shown in FIG. 13.

FIG. 15 shows the basic layout of the HD-2 bit detector block. This block describes both the HD-2 Upp and the HD-2 Low blocks. Inputted are 8 nearest neighboring bits on the hexagonal lattice and HF-samples of the two bits of the bit pair that needs to be updated. Outputted are the two updated bit values, i.e., the HD-2 detected bits. For each hexagonal cluster with one central bit and 6 neighboring bits, a reference signal level is available from a memory, i.e., the HF Reference-Level Memory. The reference level to be taken from the memory is determined by the two bits of the bit pair, and by 5 out of the 8 neighboring bits of the bit pair. The 8 neighboring bits of the bit pair comprise 3 bits of the central bit row (determined by the actual branch considered), and 5 secondary neighboring bits.

The received HF-signal for each bit of the two bits of the bit pair are subtracted from the corresponding reference level; the absolute values (shown here; it may also be any other "norm" like the quadratic norm using the squared values instead) of these respective signal differences are added together for each of the four possible two-bit configurations for the two bits of the bit pair. The bits that result from the HD-2 bit detector are those that lead to the smallest value of the above set of 4 parameters or samples of the selection criterion, one sample for each possible bit pair. This is denoted in FIG. 15 in short-hand notation by arg min: the arguments (bits $b_0$ and $b_1$ of the bit pair) for which the criterion is at the minimum.

According to an alternative embodiment, soft-decision information about the primary neighboring bits in the bit pairs (denoted by $x_2$ and $x_3$, and $x_5$ and $x_6$) is used. The branch metric for a given transition from state "i" to state "j" is then computed as an expectation value, which is the average taken over all possible bit-configurations in the two bit pairs of primary neighboring bits. Formally, this can be written as (with the index k to the HFk signal referring to the sample at the k-th bit in the hexagonal cluster):

$$\beta_{ij} =$$

$$\sum_{b_2=0}^{1}\sum_{b_3=0}^{1}\sum_{b_5=0}^{1}\sum_{b_6=0}^{1} p(x_2=b_2; x_3=b_3; x_5=b_5; x_6=b_6 \mid x_0=b_1^i; x_1=b_1^j;$$

$$x_4=b_0^j; HF_2, HF_3, HF_5, HF_6)$$

$$(HF_0 - R.L.[x_0=b_1^i; x_1=b_1^j; x_2=b_2; x_3=b_3; x_4=b_0^j; x_5=b_5; x_6=b_6])^2$$

It should be noted that the bit values denoted by ($b_0{}^i$, $b_1{}^i$) refer to the two bits in state "i" of the 4-state Viterbi-trellis (shown in FIG. 9), and similarly for state "j". The probability factor in the above expression can be split into separate factors for each of the two independent bit pairs. For each bit pair, the factor can further be split into factors relating to the individual bits, yielding:

$$p(x_2=b_2; x_3=b_3; x_5=b_5; x_6=b_6 \mid x_0=b_1^j; x_1=b_1^j; x_4=b_0^j; HF_2, HF_3,$$

$$HF_5, HF_6) = p(x_2=b_2 \mid \text{all 6 nearest neighbours of } x_2; HF_2)$$

$$x \ldots x \, p(x_6=b_6 \mid \text{all 6 nearest neighbours of } x_6; HF_6)$$

Figure 16:
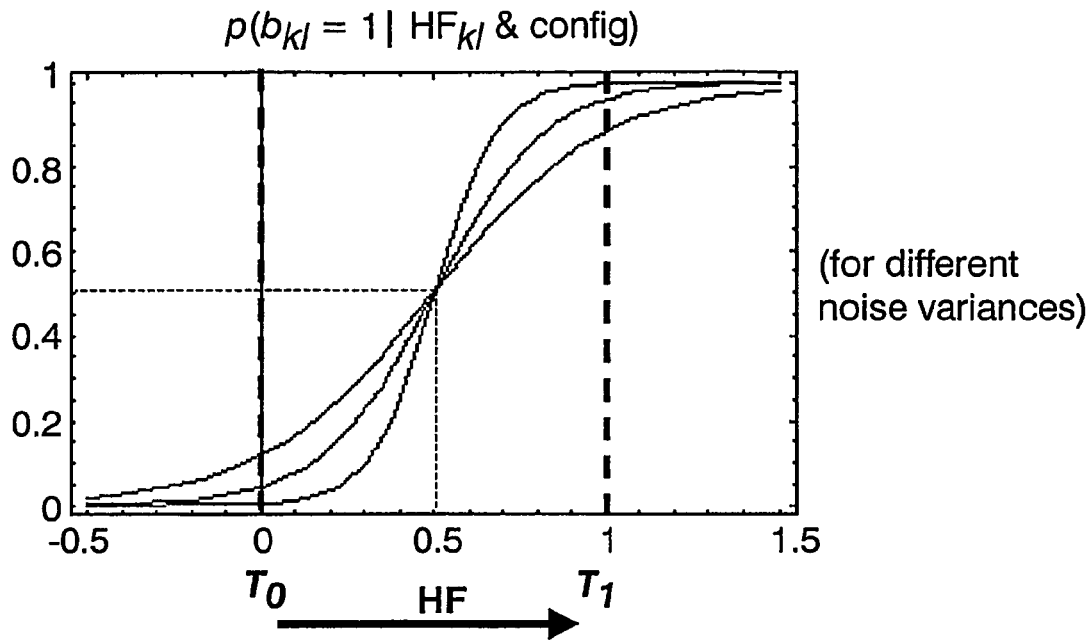
FIG. 16 shows a Fermi-Dirac like S-curve for deriving soft-decision information from a HF-signal of a bit.
Figure 17:
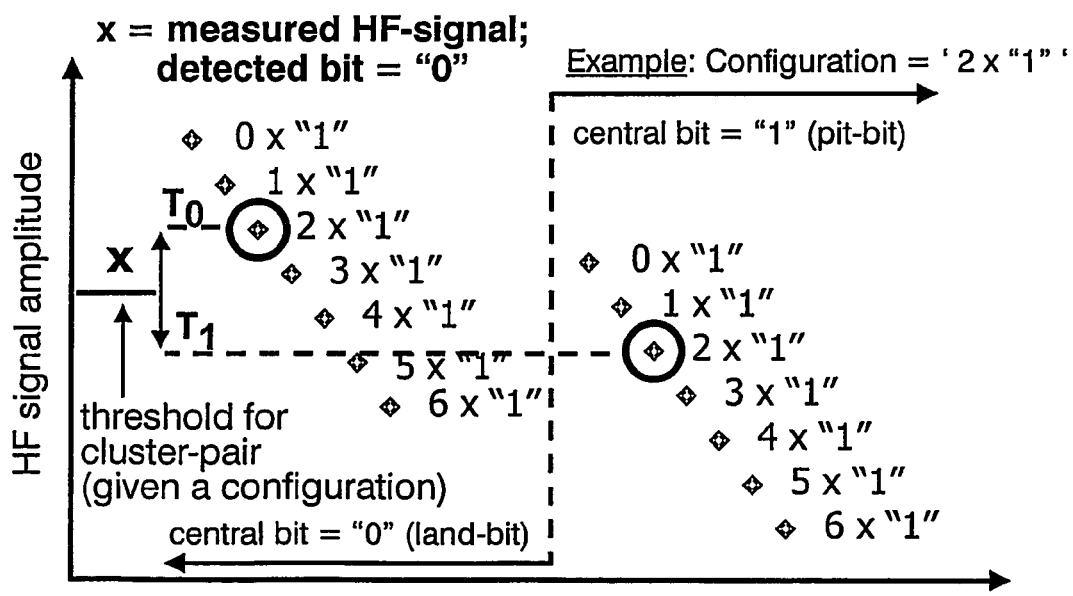
FIG. 17 shows reference levels derived from the signal pattern.

Just as in the HD-2 bit detector, reference can be made to FIG. 7, but now primary neighboring bits of the bit pairs refer to bits with soft-decision information. The nearest-neighbor bits of the bit pairs—those not part of the central bit row, nor from the HD-2 bit-unit are referred to as secondary neighboring bits—are determined by threshold detection. For each bit of the bit pairs, all of its nearest-neighbor bits are thus characterized. Soft-decision information can, for instance, be determined by a "Fermi-Dirac"-like S-curve as shown in FIG. 16 (given the configuration ("config") of nearest-neighbor bits, and the HF sample). Therein, Fermi-Dirac-like S-curves for deriving soft-decision information from the HF-signal of a bit at position (k, 1) are shown. $T_0$ is the reference level when the central bit (at (k, 1)) is a zero, $T_1$ applies for the case that the central bit is a one. The different curves relate to different noise variances. The reference levels $T_0$ and $T_1$ are derived from the signal pattern as shown in FIG. 17 where an example is given when two nearest neighbor bits in the hexagonal cluster are equal to "1".

The performance for various detectors for the density of 1.4× the density of BD has been computed. A lattice parameter a=165 nm with a pit-hole diameter equal to 120 nm (in order to avoid signal folding) has been assumed. The channel is subjected to AWGN disturbance (additive white Gaussian noise). The detectors are:

threshold detection (TD);
HD-3 Hard-Decision Iterative Bit detector (HD-3);
TD-assisted 1D-PRML;
HD-2 assisted 1D-PRML;
HD-3-assisted 1D-PRML;
SD-1 Soft-Decision Iterative Bit detector (SD-1);
Soft-Decision-assisted 1D-PRML.

Figure 18:
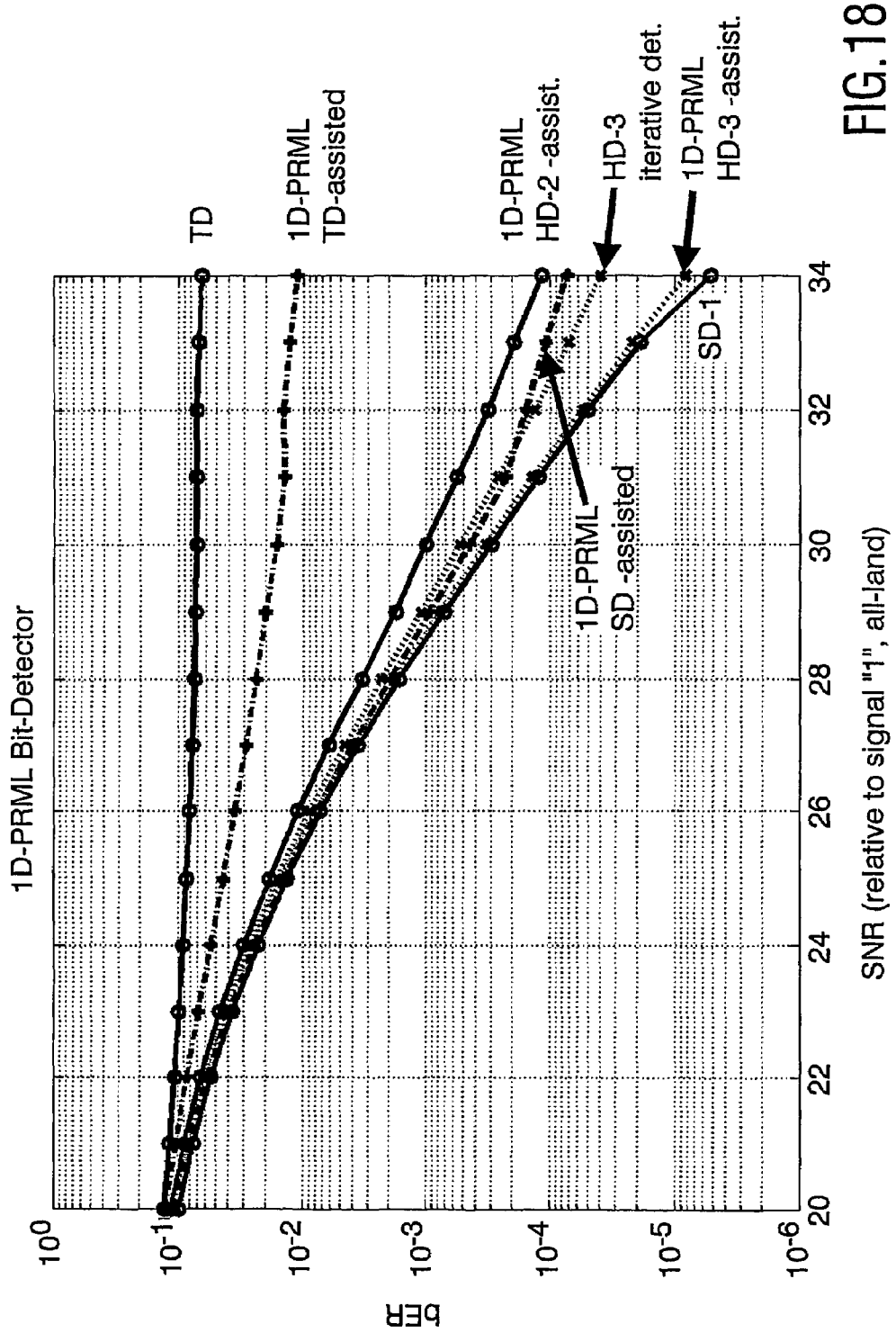
FIG. 18 shows the bit-error-rate as a function of SNR (defined relative to the full-reflection signal level) for a typical density.

The results are shown in FIG. 18. Evaluation is done in terms of the (channel) bit-error-rate (bER), as a function of the SNR of the channel. It should be noted that the TD-assisted 1D-PRML has a high bER, that is, that version of the 1D-PRML detector offers only a marginal improvement in bER compared to the TD detector itself. The HD-3-assisted 1D-PRML, on the other hand, is almost identical in performance to the soft-decision bit detector SD-1, and slightly better than the hard-decision HD-3 bit detector. The HD-3 assisted 1D-PRML is even better than the SD-assisted 1D-PRML: this might be due to the fact that the soft-decision information is obtained per bit only (and uses TD-decisions at some of its neighbors), whereas, the HD-3 assisted 1D-PRML detector searches for optimum joint (hard) bit-decisions in an area of 3-bits at each side of the considered track.

The present invention provides a solution to achieve reliable bit detection by using a number of independent 1D-Viterbi bit detectors (also known as sequence detectors) is used, one for each bit row in the channel tube: the interference between successive neighboring bit rows is taken into account via the computation of the branch metrics (for the considered bit row), in which local bit decisions on the primary neighboring bits in the neighboring rows are used. As local bit detectors going beyond the performance of a threshold detector, the use of a HD-2 or HD-3-like hard-decision bit detector is proposed. Other local bit detectors might also be used, insofar that they take account of the specific bit values for the respective branches in the Viterbi trellis of the central row that is being processed with one-dimensional row-based Viterbi bit detector to condition the preliminary bit detection for the primary neighboring bits in the neighboring rows of the considered bit row.

Further, it is proposed to use the output of a soft-decision bit detector at the bits in the neighboring rows of the central row, in order to compute the branch metrics. Practically, it is proposed to use soft-decision information that can be directly generated from the signal pattern (with 2×7 signal levels, grouped as 7 pairs of levels). Of course, other soft-decision bit detectors can be used for the same purpose, like e.g., iterative soft-decision-detectors. Preferably, the two- and three-dimensional cases are advantageous where the bits are arranged on a two- or three-dimensional lattice.

The invention claimed is:

1. A Viterbi bit detection method for detecting the bit values of bits of a channel data stream stored on a record carrier along an N-dimensional channel tube, N being at least two, of at least two bit rows one-dimensionally evolving along a first direction and being aligned with each other along at least a second of N−1 other directions, said first direction together with said N−1 other directions constituting an N-dimensional lattice of bit positions, said Viterbi bit detection method comprising the steps of:

applying a row-based one-dimensional Viterbi bit detection method independent for each of the bit rows of said channel tube;

calculating branch metrics for all possible state transitions in a Viterbi trellis of a one-dimensional row-based Viterbi detector, said transitions representing a number of subsequent bits in said bit row, said bits being the central-row bits of a cluster of the N-dimensional lattice of bits, said calculating being based on the difference of the received HF signal value with respect to a reference level, wherein said reference level depends on all bits of said cluster, said cluster comprising, in addition to the central-row bits, a number of primary neighboring bits in each of a number of neighboring bit rows on each side along said N−1 other directions of said central bit row along which the one-dimensional Viterbi bit detection method is applied, and wherein preliminary bit decisions for the primary neighboring bits in the neighboring bit rows are used for determining the reference level to be used for calculating said branch metrics; and selecting the bit value for the central bit of said cluster of the N-dimensional lattice of bits, corresponding with said received HF signal value, based on the calculated branch metrics.

2. The method as claimed in claim 1, wherein the preliminary bit decisions on said primary neighboring bits in the neighboring bit rows are obtained by threshold detection using a slicer level.

3. The method as claimed in claim 1, wherein the bit values of the central row constituting each of said branches in the Viterbi trellis of the central row are used for determining the preliminary bit decisions on said primary neighboring bits in the neighboring bit rows.

4. The method as claimed in claim 1, wherein the preliminary bit decisions on the primary neighboring bits are obtained by evaluation of a predetermined criterion which is determined by the sum over all the primary neighboring bits, said sum comprising terms related to a subcriterion that is based on the differences of the HF signal value and a reference HF signal value corresponding to the bit cluster of each single primary neighboring bit, said evaluation being done for all possible bit units obtained for all possible values of said primary neighboring bits, and wherein the bit unit with the lowest value of said predetermined evaluation criterion is selected.

5. The method as claimed in claim 4, wherein said subcriterion relates to the squared value of the difference of the HF signal value and a reference HF signal value corresponding to the bit cluster of each single primary neighboring bit.

6. The method as claimed in claim 4, wherein said subcriterion relates to the absolute value of the difference of the HF signal value and a reference HF signal value corresponding to the bit cluster of each single primary neighboring bit.

7. The method as claimed in claim 1, wherein the preliminary bit decisions on the primary neighboring bits are obtained by use of soft-decision information.

8. The method as claimed in claim 1, wherein further preliminary bit decisions on secondary neighboring bits, being the neighboring bits of said primary neighboring bits but not being part of the central bit row of said cluster, are used for determining the preliminary bit decisions on said primary neighboring bits.

9. The method as claimed in claim 8, wherein said branch metrics are calculated as an expectation value, in particular the average taken over all possible bit values of said secondary neighboring bits using soft-decision information available for said secondary neighboring bits.

10. The method as claimed in claim 1, wherein said branch metrics are determined as the absolute value of the difference between the received HF signal value for the central bit of said cluster and a reference HF signal value depending on the bit values of all bits of said cluster.

11. The method as claimed in claim 1, wherein N is 2 and wherein the bit values of bits of a channel data stream are stored on a record carrier along a two-dimensional channel strip of at least two bit rows one-dimensionally evolving along a first direction and aligned with each other along a second direction, said two directions constituting a two-dimensional lattice of bit positions.

12. The method as claimed in claim 11, wherein the 2D lattice of bits is a square configuration.

13. The method as claimed in claim 11, wherein the 2D lattice of bits is a hexagonal configuration.

14. The method as claimed in claim 13, wherein said channel strip comprises at least three bit rows and wherein said hexagonal configured 2D lattice of bits comprises seven bits, three being located in the central bit row and two being located in an upper and lower primary neighboring bit row, respectively.

15. The method as claimed in claim 13, wherein preliminary bit decisions on secondary neighboring bits are used for determining the preliminary bit decisions on said two neighboring primary bits in each primary neighboring bit row.

16. The method as claimed in claim 15, wherein the two primary neighboring bits of the hexagonal cluster located in the upper and lower primary neighboring bit row, respectively, are grouped as primary neighboring bit unit each bit unit being surrounded by eight neighboring bits, five of which being secondary neighboring bits and three of which being the central-row bits of said hexagonal cluster, said three bits being set by the bits of the two states constituting each of the branches to be considered in the Viterbi trellis of the one-dimensional row-based Viterbi bit detector.

17. The method as claimed in claim 15, wherein the two primary neighboring bits of the hexagonal cluster located in the upper and lower primary neighboring bit row, respectively, are grouped as a primary neighboring bit unit together with one bit of the next neighboring bit row constituting a bit unit consisting of 3 bits, each bit unit being surrounded by nine neighboring bits, six of which being secondary neighboring bits, and three of which being the central-row bits of said hexagonal cluster, said three bits being set by the bits of the two states constituting each of the branches to be considered in the Viterbi trellis of the one-dimensional row-based Viterbi bit detector.

18. The method as claimed in claim 16, wherein the bit values of the secondary neighboring bits being the neighboring bits of the primary neighboring bits not belonging to the central row of said hexagonal cluster are determined by threshold detection using a slicer level.

19. The method as claimed in claim 1, wherein said branch metrics are determined as the squared difference between the received HF signal value for the central bit of said cluster and a reference HF signal value depending on the bit values of all bits of said cluster.

20. The method as claimed in claim 1, wherein N is 3 yielding a three-dimensional lattice of bits.

21. The method as claimed in claim 1, wherein said row-based one-dimensional Viterbi bit detection method is applied iteratively and wherein preliminary bit decisions on the primary neighboring bits are obtained from the output of said row-based one-dimensional Viterbi bit detection methods in a previous iteration.

22. A Viterbi bit detector for detecting the bit values of bits of a channel data stream stored on a record carrier along an N-dimensional channel tube, N being at least two, of at least two bit rows one-dimensionally evolving along a first direction and being aligned with each other along at least a second of N−1 other directions, said first direction together with said N−1 other directions constituting an N-dimensional lattice of bit positions, said Viterbi bit detector comprising a Viterbi bit detection unit for application of a row-based one-dimensional Viterbi bit detection method independent for each of the bit rows of said channel tube, said Viterbi bit detection unit comprising:
    means for calculating branch metrics for all possible state transitions in a Viterbi trellis of a one-dimensional row-based Viterbi detector, said transitions representing a number of subsequent bits in said bit row, said bits being the central-row bits of a cluster of the N-dimensional lattice of bits, said calculating being based on the difference of the received HF signal value with respect to a reference level, wherein said reference level depends on all bits of said cluster, said cluster comprising, in addition to the central-row bits, a number of primary neighboring bits in each of a number of neighboring bit rows on each side along said N−1 other directions of said central bit row along which the one-dimensional Viterbi bit detector is applied, and wherein preliminary bit decisions for the primary neighboring bits in the neighboring bit rows are used for determining the reference level to be used for calculating said branch metrics; and
    means for selecting the bit value for the central bit of said cluster of the N-dimensional lattice of bits, corresponding with said received HF signal value, based on the calculated branch metrics.

23. The bit detector as claimed in claim 22, wherein said selecting means comprises add-compare-select units and back-tracking units.

24. A method of reproducing a user data stream, said user data stream being error correction code and modulation code encoded into a channel data stream and stored on a record carrier, said reproducing method comprising a Viterbi bit detection method for detecting the bit values of bits of the channel data stream stored on the record carrier along an N-dimensional channel tube, N being at least two, of at least two bit rows one-dimensionally evolving along a first direction and being aligned with each other along at least a second of N−1 other directions, said first direction together with said N−1 other directions constituting an N-dimensional lattice of bit positions, a modulation code decoding method and an error correction code decoding method, wherein said Viterbi bit detection method comprises the steps of:
    applying a row-based one-dimensional Viterbi bit detection method independent for each of the bit rows of said channel tube;
    calculating branch metrics for all possible state transitions in a Viterbi trellis of a one-dimensional row-based Viterbi detector, said transitions representing a number of subsequent bits in said bit row, said bits being the central-row bits of a cluster of the N-dimensional lattice of bits, said calculating being based on the difference of the received HF signal value with respect to a reference level, wherein said reference level depends on all bits of said cluster, said cluster comprising, in addition to the central-row bits, a number of primary neighboring bits in each of a number of neighboring bit rows on each side along said N−1 other directions of said central bit row along which the one-dimensional Viterbi bit detection method is applied, and wherein preliminary bit decisions for the primary neighboring bits in the neighboring bit rows are used for determining the reference level to be used for calculating said branch metrics; and selecting the bit value for the central bit of said cluster of the N-dimensional lattice of bits, corresponding with said received HF signal value, based on the calculated branch metrics.

25. A reproduction device for reproduction of a user data stream, said user data stream being error correction code and modulation code encoded into a channel data stream and stored on a record carrier, said reproduction device comprising a Viterbi bit detector for detecting the bit values of bits of the channel data stream stored on the record carrier along an N-dimensional channel tube, N being at least two, of at least two bit rows one-dimensionally evolving along a first direction and being aligned with each other along at least a second of N−1 other directions, said first direction together with said N−1 other directions constituting an N-dimensional lattice of bit positions, a modulation code decoder and an error correction code decoder, wherein said Viterbi bit detection unit comprising:

means for calculating branch metrics for all possible state transitions in a Viterbi trellis of a one-dimensional row-based Viterbi detector, said transitions representing a number of subsequent bits in said bit row, said bits being the central-row bits of a cluster of the N-dimensional lattice of bits, said calculating being based on the difference of the received HF signal value with respect to a reference level, wherein said reference level depends on all bits of said cluster, said cluster comprising, in addition to the central-row bits, a number of primary neighboring bits in each of a number of neighboring bit rows on each side along said N−1 other directions of said central bit row along which the one-dimensional Viterbi bit detector is applied, and wherein preliminary bit decisions for the primary neighboring bits in the neighboring bit rows are used for determining the reference level to be used for calculating said branch metrics; and means for selecting the bit value for the central bit of said cluster of the N-dimensional lattice of bits, corresponding with said received HF signal value, based on the calculated branch metrics.

26. An optical recorder comprising a Viterbi bit detector for detecting the bit values of bits of a channel data stream stored on a record carrier along an N-dimensional channel tube, N being at least two, of at least two bit rows one-dimensionally evolving along a first direction and being aligned with each other along at least a second of N−1 other directions, said first direction together with said N−1 other directions constituting an N-dimensional lattice of bit positions, said Viterbi detector comprising a Viterbi bit detection unit for application of a row-based one-dimensional Viterbi bit detection method independent for each of the bit rows of said channel tube, said Viterbi bit detection unit comprising:

means for calculating branch metrics for all possible state transitions in a Viterbi trellis of a one-dimensional row-based Viterbi detector, said transitions representing a number of subsequent bits in said bit row, said bits being the central-row bits of a cluster of the N-dimensional lattice of bits, said calculating being based on the difference of the received HF signal value with respect to a reference level, wherein said reference level depends on all bits of said cluster, said cluster comprising, in addition to the central-row bits, a number of primary neighboring bits in each of a number of neighboring bit rows on each side along said N−1 other directions of said central bit row along which the one-dimensional Viterbi bit detector is applied, and wherein preliminary bit decisions for the primary neighboring bits in the neighboring bit rows are used for determining the reference level to be used for calculating said branch metrics; and means for selecting the bit value for the central bit of said cluster of the N-dimensional lattice of bits, corresponding with said received HF signal value, based on the calculated branch metrics.

* * * * *